June 13, 1967            JAMES E. WEBB            3,325,229
ADMINISTRATOR OF THE NATIONAL AERONAUTICS
AND SPACE ADMINISTRATION
AIR BEARING Filed Dec. 31, 1964                              2 Sheets-Sheet 1

INVENTOR.
JOHN H. McLAIN
BY
ATTORNEYS

INVENTOR.
JOHN H. McLAIN

3,325,229
AIR BEARING
James E. Webb, Administrator of the National Aeronautics and Space Administration, with respect to an invention of John H. McLain, Huntsville, Ala.
Filed Dec. 31, 1964, Ser. No. 422,868
5 Claims. (Cl. 308—5)

This invention relates generally to air bearings and more particularly to air bearings for supporting loads either stationary or during movement on a planar surface.

The operation of machinery and other apparatus, such as loaded vehicles, often involves the movement of machinery components or vehicles over a planar surface. This movement may be rather constant or intermittent depending on the nature of the particular apparatus. In any case, substantial pressure is transferred by the apparatus to the supporting planar surface, whether the apparatus is moving over the planar surface or resting stationary thereon.

It is apparent that the bearings which transfer the pressure from the movable apparatus to the planar surface are of critical importance. Often, a primary requirement is that the bearings have the capability of providing a near frictionless transfer of force from the movable apparatus to the planar surface. This invention meets this requirement by utilizing an air cushion between the bearing surfaces and the planar surface upon which the bearings float. However, this manner of eliminating friction between the bearings and the planar surface makes it essential that the delicate bearing surfaces be kept free from damage such as scratches, dents, cracks or other disfigurement. This type of damage to the bearing surfaces may occur, for example, when the load-bearing capacity of the air cushion between the moving bearing and the planar surface is exceeded, permitting the highly-loaded bearing to collide with or drag against the planar surface. A similar result would follow failure of air supply or inadvertent air cut-off while the bearing was moving over the planar surface. Also, the bearing surface may be impaired if it is required to support a heavy stationary load when no air cushion is being applied. Therefore, an effective means is needed for preventing the delicate air bearing surfaces from transferring the load pressure to the planar surface unless such transfer is made through the intermediary air cushion.

Another consideration in the successful performance of the air bearing is the need for a uniform distribution of load pressure over the bearing surface. The apparatus which the bearings support will normally be disposed parallel with the bearing surfaces and transfer a substantially axial load to the bearing, which load will be evenly distributed over the bearing surfaces. However, it is desirable that the bearing be capable of tolerating small deviations from this parallel and/or axial loading condition. These deviations may result, for instance, from intermittent shifting or jerking of the supported apparatus.

Prior friction-reducing means for transferring the weight of a movable apparatus to a planar surface include wheels, roller bearings and slides, as well as the introduction of an air cushion between the base of a machine element and a planar surface on which the element moves. However, none of the prior devices are entirely suitable for the frictionless support of moving apparatus. Bearings which roll under the apparatus do not adequately eliminate friction. In the prior devices where the base of a movable machine element constitutes an air bearing surface, no means is provided for protecting the bearing surface against damage resulting from overloading of the air cushion or from air cut-off as discussed above. Moreover, with respect to large and heavy apparatus, special and distinct bearings are required since it would be impractical to utilize the base of the apparatus as an air bearing surface.

Accordingly, it is a general object of this invention to provide a bearing member capable of near frictionless transfer of a load from one body to another.

More specifically, it is an object of the invention to provide an air bearing for supporting an apparatus on a planar surface and permitting the apparatus to move virtually free of friction over the planar surface.

A further object is to provide an air bearing capable of near frictionless transfer of a load to a supporting surface and incorporating means for preventing the delicate air bearing surface from transferring the load pressure to the supporting surface unless such transfer is made through an intermediary air cushion.

Another object is to provide an air bearing capable of tolerating slight deviations in the relative position of a body supported by the bearing as well as deviations in the load direction imposed on the bearing by the supported body.

Other objects, uses, and advantages of the present invention will become more apparent as the description proceeds.

The invention comprises an air bearing adapted to carry a movable apparatus and to transfer the load of the apparatus to a supporting planar surface in a near frictionless manner. The air bearing comprises a main bearing component which component includes a main bearing surface that is adapted to float on an air cushion over the supporting planar surface, thus transferring the load of the moving apparatus to such planar surface. The bearing surface of the main bearing is disposed adjacent the bearing surface of an auxiliary bearing component. The main bearing component and the auxiliary bearing component are movable independently of each other in a vertical plane.

When the main bearing component is floating on an air cushion the load of the supported apparatus is exerted on the main bearing component through the auxiliary bearing component. The air cushion exerts an upward force on the main bearing component which exceeds the downward force exerted by the load, thereby sustaining a small space between the bearing surface of the main bearing component and the supporting surface. The auxiliary bearing component also floats a slight distance from the supporting surface by being subjected, as by a source of air pressure, to an upward force exceeding the downward force exerted by the load but which is less than the upward force of the air cushion. Since the auxiliary bearing component is movable into contact with the supporting surface independently of the main bearing component, the auxiliary bearing component will always transfer to the supporting surface any overloading of the air bearing without affecting the air cushion between the main bearing component and the supporting surface. Thus, the delicate bearing surface of the main bearing component is protected from damage since it is not forced into contact with the supporting surface while under load. In this manner, overloading causes a minimum disturbance to the normal operation of the bearing, and normal operation of the bearing will resume immediately on return to normal load conditions. When the air bearing is supporting an apparatus during static, air-off condition no upward force is applied either to the main bearing component or the auxiliary bearing component. The downward force exerted by the load is transferred to the supporting planar surface entirely by the auxiliary bearing component thereby avoiding stress on the main bearing surface.

The bearing surface of the auxiliary bearing component may expediently be made of phenolic material. It is separate and distinct from the main bearing surface and it is not as critical and delicate as the main bearing surface. Also, it may be replaced if needed without replacing the main bearing surface.

According to one aspect of the invention, a secondary air bearing is incorporated between the supported apparatus and the assembly comprising the main bearing component and the auxiliary bearing component. The secondary bearing has a spherically contoured bearing shoe which rests on a corresponding cap mounted on the assembly comprising the main bearing component and the auxiliary bearing component. A single source of air pressure may supply an air cushion for both the main bearing component and the secondary air bearing. The function of the secondary air bearing is to incorporate a load shift tolerance in the bearing by permitting a small amount of swivel of the supported apparatus on the bearing.

Figure 1:
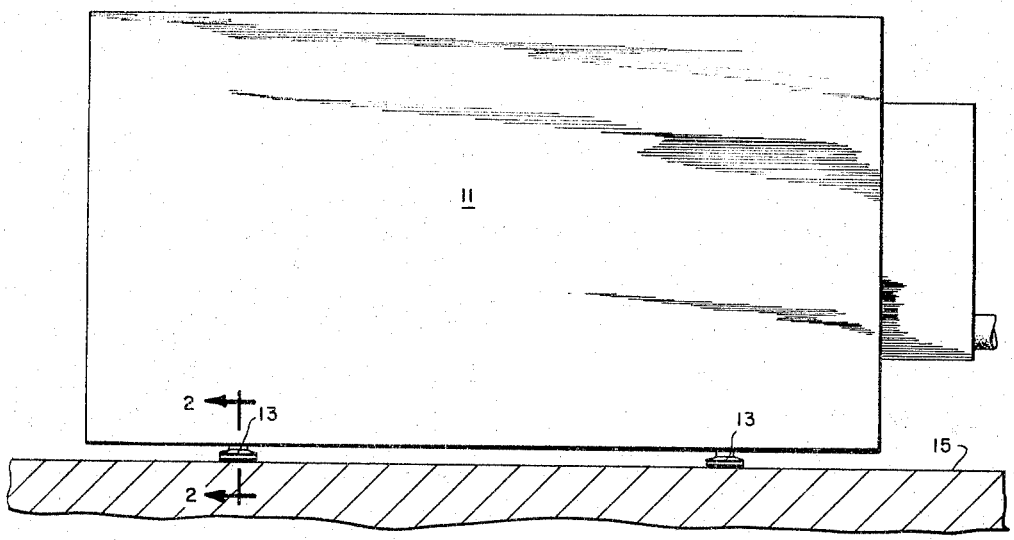
FIGURE 1 is an elevational view of a portion of a movable apparatus supported by a plurality of air bearings on a planar surface.

Referring now to FIGURE 1, a movable apparatus 11 is supported by air bearings 13 on a planar surface 15. The apparatus 11 represents any machine, vehicle, or component which is designed in some phase of its operation to move by gliding, such as in a circular, reciprocating or irregular manner, over a planar surface. The function of the air bearings 13 is to facilitate such movement by acting as near frictionless load bearing units between the apparatus and the planar surface.

Figure 4:
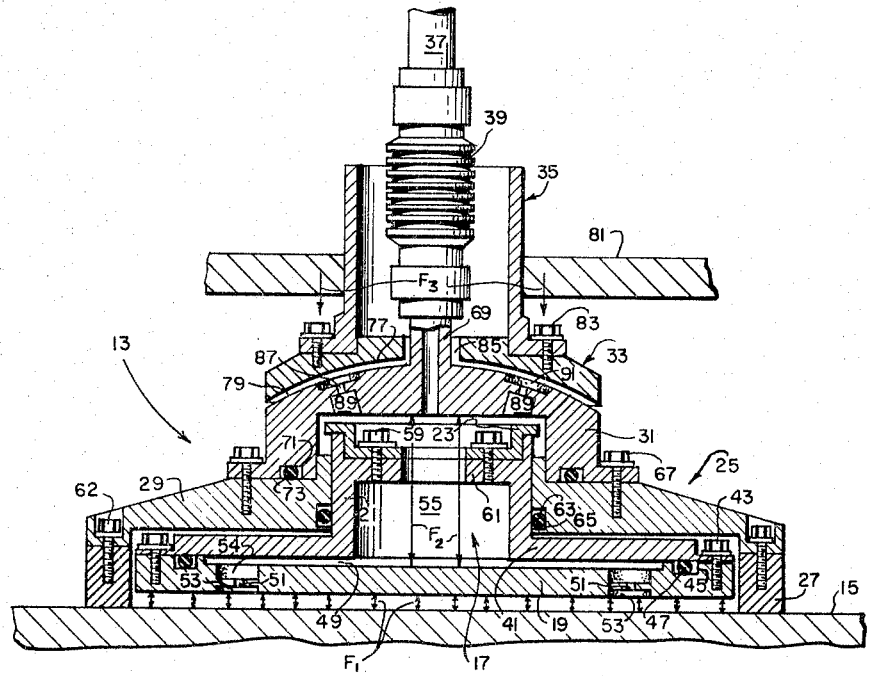
FIGURE 4 is a cross-sectional view of the air bearing of FIGURE 3 subjected to an overload.
Figure 2:
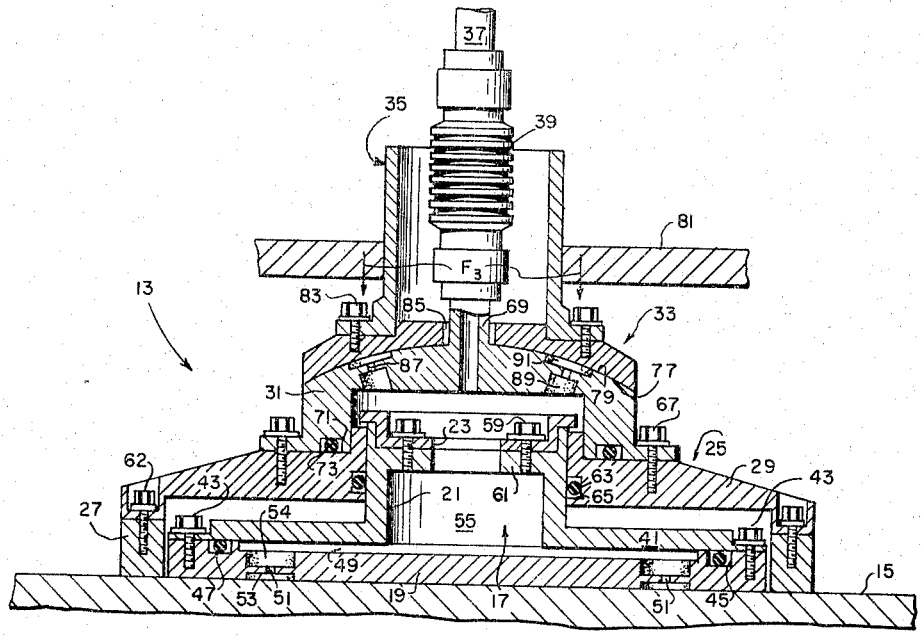
FIGURE 2 is a cross-sectional view along line 2—2 of FIGURE 1 showing an air bearing in the static, air-off, condition.
Figure 3:
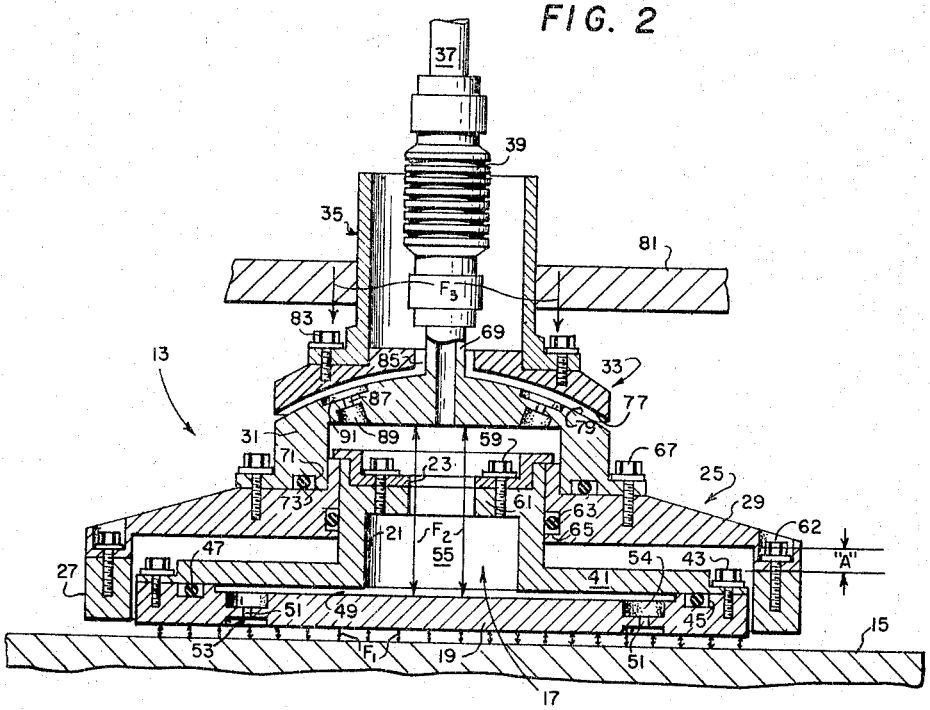
FIGURE 3 is a cross-sectional view of the air bearing of FIGURE 2 floating on an air cushion after an air pressure has been applied to the bearing.

As shown in FIGURES 2, 3, and 4, each air bearing 13 comprises five basic compounds as follows:

(1) A main bearing 17 which includes a bearing shoe 19, a piston 21 and a stop 23;

(2) a housing 25 which, as explained later, serves as an auxiliary bearing, and includes a rest 27, a cylinder 29 and a cap 31;

(3) a secondary bearing 33;

(4) a load bearing column 35; and (5) an air line 37 including a flexible coupling 39.

These basic components are assembled in axial alignment and are of circular configuration in plan, although it will be evident that other configurations and arrangements may be used as desired.

The piston 21 of the main bearing component 17 has a base 41 the periphery of which coincides with the periphery of the bearing shoe 19, these elements being connected by bolts 43. A circular groove 45 in the bearing shoe 19 receives a seal 47 providing a seal between the bearing shoe 19 and the piston base 41. The side of the bearing shoe 19 facing the piston 21 is concentrically recessed to form a space 49 between the bearing shoe and the piston base 41. Air passage from the space 49 to the underside of the bearing shoe 19 is through orifices 51 symmetrically spaced around the vertical axis of the bearing assembly. Air pockets 53 and 54 are formed in the opposing surfaces of the bearing shoe 19 concentric with the respective orifices 51.

The space 49 between the bearing shoe 19 and the piston base 41 communicates with an air chamber 55 extending through the piston 21. The stop element 23 is mounted on the upper end of the piston 21 by bolts 59 which extend through a piston flange 61. The cylinder 29 of the housing 25 encompasses the piston 21 and overlies the piston base 41 and the bearing shoe 19. A seal 63 between the piston 21 and the cylinder 29 is carried in a cylinder groove 65. The housing rest 27, the bearing surface of which is preferably made of a phenolic material, encircles the bearing shoe 19 and is joined to the housing cylinder 29 by bolts 62. Mounted on the upper end of the housing cylinder 29 is the cap 31 which covers the piston 21, connection being made by bolts 67. Integral with the cap 31 is a tubular fitting 69 for receiving the flexible coupling 39 of the air line 37. A circular groove 71 in the cap 31 contains a seal 73 which constitutes a seal between the housing cap 31 and the housing cylinder 29.

A small degree of swivel of the apparatus 11 on the bearings 13 is permitted by the secondary bearing 33 having a concave surface 77 movably fitted over a convex surface 79 of the housing cap 31. The load-bearing column 35 is rigidly connected as by welding, if desired, to a base plate 81 of the apparatus 11 and at its lower end is connected by bolts 83 to the secondary bearing 33. Swivel movement of the secondary bearing 33 is limited by the fitting 69 extending through an aperture 85 formed in the center of the secondary bearing, the diameter of the aperture 85 being somewhat larger than the diameter of the fitting.

To substantially eliminate friction between the housing cap 31 and the secondary bearing 33, an air cushion is supplied between these elements through orifices 87 which communicate with the air chamber 55. Air pockets 89 and 91 are formed in opposing surfaces of the secondary bearing 33 concentric with the respective orifices 87.

When air pressure is introduced into the air chamber 55 of the main bearing component 17 air passes through the orifices 51 forming an air cushion, designated $F_1$, under the bearing shoe 19 (FIGURE 3) thus forcing the bearing shoe upwardly and out of contact with the planar surface 15. The air pressure introduced into the air chamber 55 also applies a pressure, designated $F_2$, between the main bearing component and the housing cup 31. The forces $F_1$ and $F_2$ each exceed the downward force, designated $F_3$, exerted on the bearing 13 by the apparatus 11 so that the housing 25 as well as the main bearing component are lifted a slight distance from the surface 15. The housing 25 is downwardly movable independently of the main bearing component through the distance A (FIGURE 3).

The components are designed to assure a proper ratio between $F_1$ and $F_2$, which is that $F_1$ exceeds $F_2$ in magnitude by a significant amount, about 30%, for example. The ratio between these forces is proportional to the ratio between the effective pressure bearing area of the piston 21 and the bearing area of the bearing shoe 19. Additional factors other than bearing area which determine the magnitude of $F_1$ are the line air pressure in line 37 and the bearing efficiency, which is proportional to the thickness of the air cushion gap between the bearing shoe 19 and the planar surface 15. As the thickness of the gap decreases the bearing efficiency increases. The factor other than piston area which determines the magnitude of $F_2$ is the line air pressure. Assuming a bearing efficiency of 30% and a line air pressure of 15 lbs./in.$^2$, bearing areas of 0.785 in.$^2$ and 3.375 in.$^2$, respectively, for the piston and the bearing shoe would give a suitable ratio between $F_1$ and $F_2$ as shown by the following equations:

$F_1 = (3.375$ in.$^2)$ $(0.30)$ $(15$ lbs./in.$^2) = 15.18$ lbs.
$F_2 = (0.785$ in.$^2)$ $(15$ lbs./in.$^2) = 11.75$ lbs.
Ratio of $F_1$ to $F_2 = 1.29$ to $1$ Under these circumstances if the load $F_3$ increases for any reason beyond the load bearing capacity of the air cushion $F_1$ the housing 25 will be forced downwardly into contact with the planar surface 15 to absorb the overload while the main bearing component continues to float on the air cushion $F_1$ (see FIGURE 4). This auxiliary load bearing capability of the housing 25 protects the delicate bearing surface of the bearing shoe 19 from serious damage which would otherwise result from bumping against the planar surface 15. When the air bearings 13 are required to support the apparatus 11 while stationary and no air is being supplied, as in FIGURE 2, the weight of the apparatus 11 is transferred to the planar surface 15 through the respective housings 25, imposing no stress on the main bearing components.

The design of the secondary bearing 33 relative to the piston 21 and the housing cap 31 is such as to assure an air cushion, constituting a force equal to or greater than $F_1$, between the secondary bearing and the housing cap.

Obviously, many modifications and variations of the present invention are possible in the light of the above teachings. It is, therefore, to be understood that within the scope of the appended claims the invention may be practiced other than as specifically described.

What is claimed is:

1. An air bearing supporting a movable load on a planar surface:
    (a) said air bearing comprising a main bearing plate having a main bearing surface facing said planar surface;
    (b) said air bearing having a cap portion spaced from and substantially axially aligned with said main bearing plate and having a spherically contoured surface;
    (c) a secondary bearing component swivelled on said cap portion and having a contoured surface corresponding to and being contiguous with said contoured surface of said cap portion;
    (d) means connecting said secondary bearing component and said load;
    (e) means for supplying an air cushion between said contoured surfaces and between said main bearing surface and said planar surface;
    (f) said means for supplying an air cushion including an enclosure constituting an air chamber between said main bearing plate and said cap portion and a plurality of air passage orifices extending through said cap portion from said chamber to said contoured contiguous surfaces and a plurality of air passage orifices extending through said plate from said chamber to said main bearing surface;
    (g) said cap portion having an air inlet means extending therethrough and communicating with said chamber.

2. The invention as defined in claim 1 including means extending through said secondary bearing component for limiting swivel movement of said secondary bearing component on said cap portion.

3. An air bearing comprising:
    (a) a main bearing shoe comprising a plate having a bearing surface adapted to bear on a planar surface;
    (b) a piston having an opening extending therethrough said piston being connected to and extending from said plate on the side thereof opposite said bearing surface;
    (c) a housing having a cylinder receiving said piston;
    (d) said housing further having a bearing surface adapted to bear on a planar surface and being substantially coplanar with said bearing surface of said plate;
    (e) said piston and said bearing shoe being movable in said housing axially thereof;
    (f) means for supplying an air cushion for said bearing surface of said plate to float on a planar surface;
    (g) said means including an air chamber comprising said opening in said piston and a plurality of air passage orifices extending from said chamber through said plate to said bearing surface;
    (h) said housing further having a cap overlying the end of said piston opposite said plate, said cap having an air inlet means extending therethrough and communicating with said air chamber.

4. The air bearing as defined in claim 3, including means for limiting movement of said bearing shoe outwardly of said housing and including a secondary bearing shoe swivelled on said cap of said housing.

5. The air bearing as defined in claim 4 including a load bearing element connected to said secondary bearing shoe and adapted to transfer a load to said secondary bearing shoe.

References Cited
UNITED STATES PATENTS

| | | | |
|---|---|---|---|
| 1,510,814 | 10/1924 | Wintroath | 308—9 |
| 2,003,316 | 6/1935 | Schein | 308—9 X |
| 2,868,593 | 1/1959 | Jones. | |
| 3,119,639 | 1/1964 | Adams | 308—9 |
| 3,137,530 | 6/1964 | Kohler. | |
| 3,137,531 | 6/1964 | Herrmann | 308—9 |
| 3,152,845 | 10/1964 | Ertaud. | |
| 3,169,807 | 2/1965 | Abel | 308—122 X |
| 3,194,613 | 7/1965 | Pierry | 308—9 |
| 3,238,790 | 3/1966 | Scholien | 308—9 X |

FOREIGN PATENTS

| | | |
|---|---|---|
| 841,479 | 7/1960 | Great Britain. |

MARTIN P. SCHWADRON, *Primary Examiner.*

L. L. JOHNSON, *Assistant Examiner.*